Figure 1:
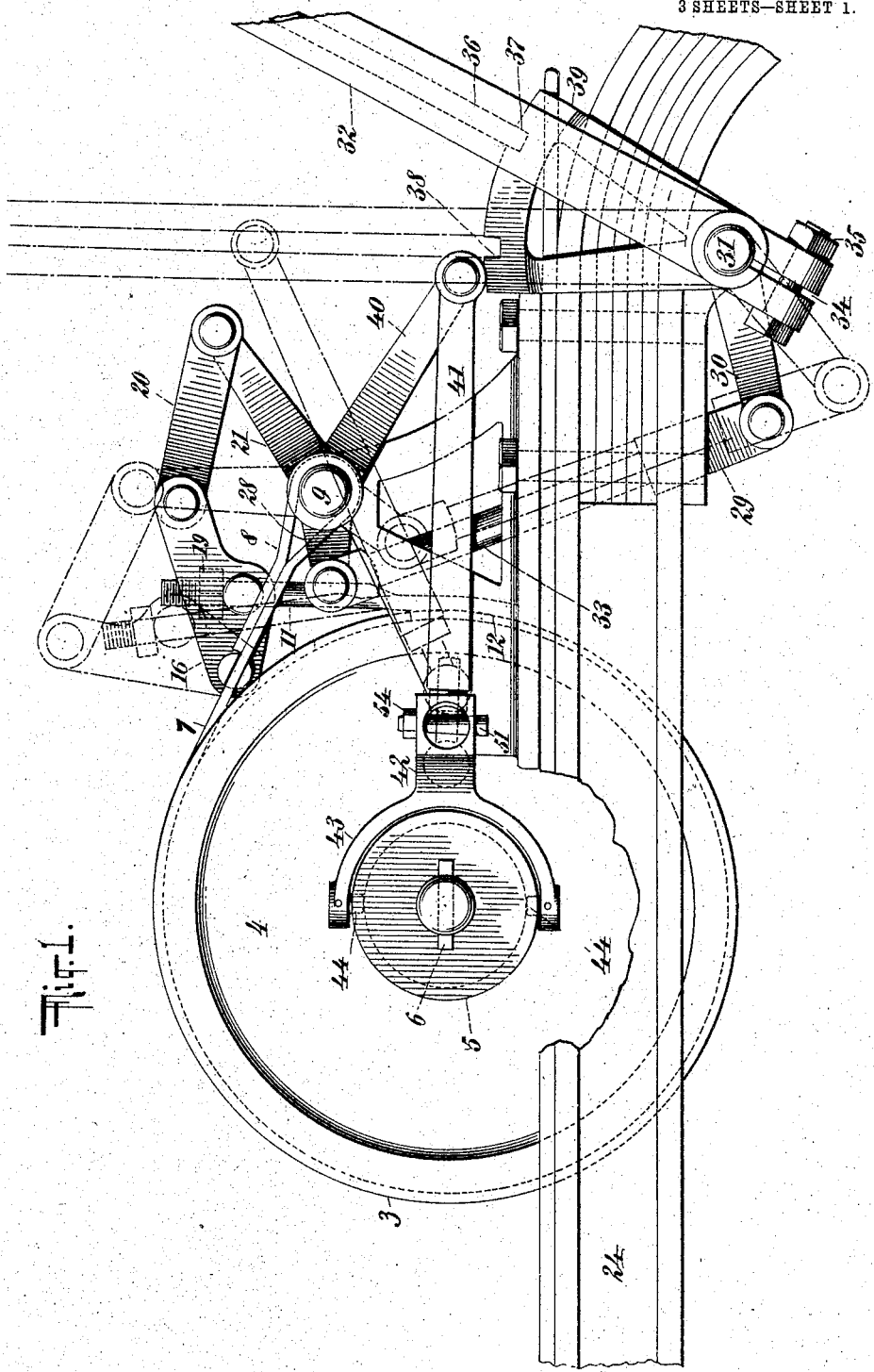

No. 781,069. PATENTED JAN. 31, 1905.
E. R. HEWITT.
CONTROL GEAR FOR AUTOMOBILES.
APPLICATION FILED APR. 8, 1904.

3 SHEETS—SHEET 1.

Witnesses
Gustave Dieterich
Edwin H. Dietrich

Inventor
Edward R. Hewitt
By his Attorney
W. A. Rosenbaum

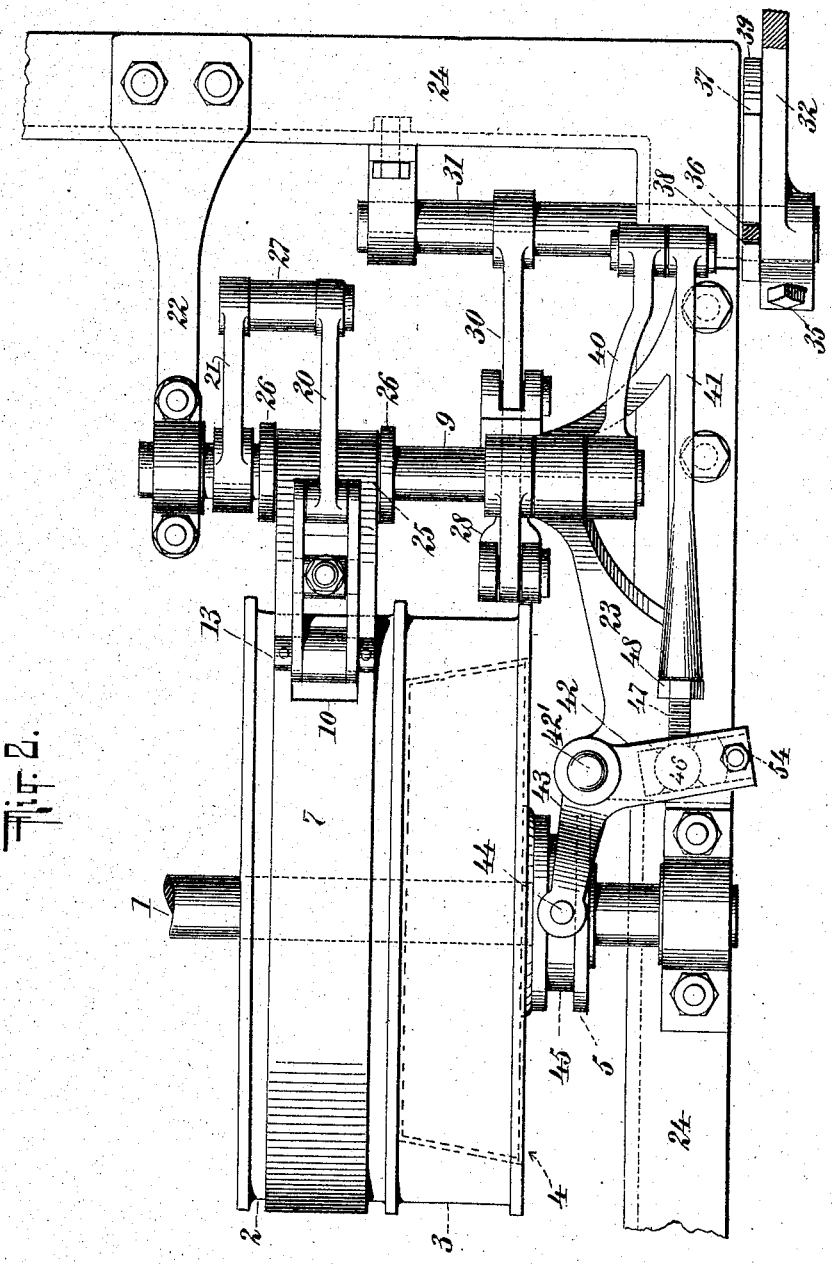

No. 781,069. PATENTED JAN. 31, 1905.
E. R. HEWITT.
CONTROL GEAR FOR AUTOMOBILES.
APPLICATION FILED APR. 8, 1904.
3 SHEETS—SHEET 3.
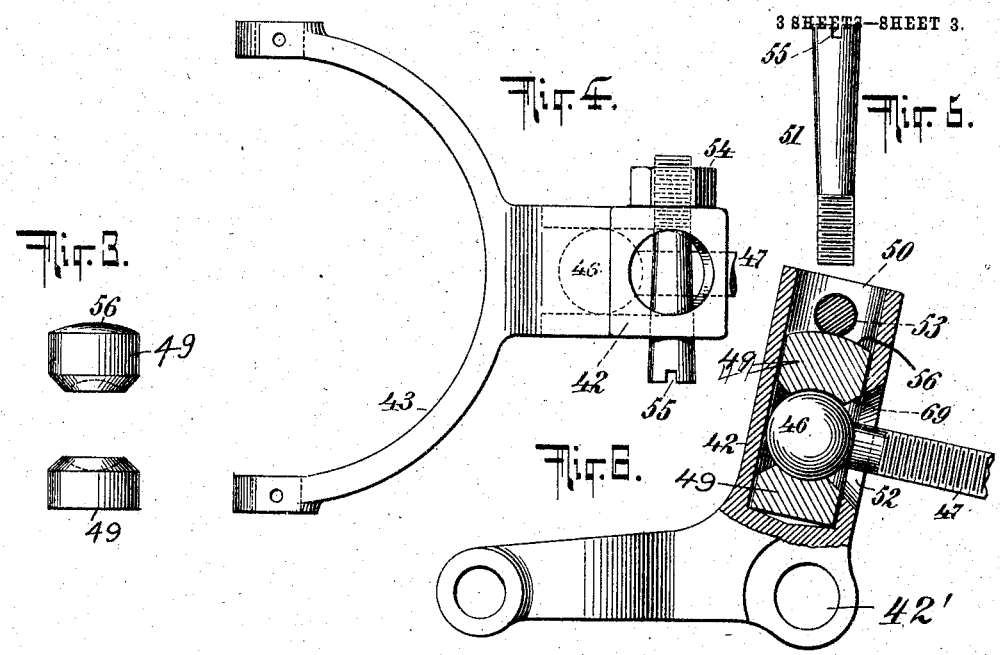
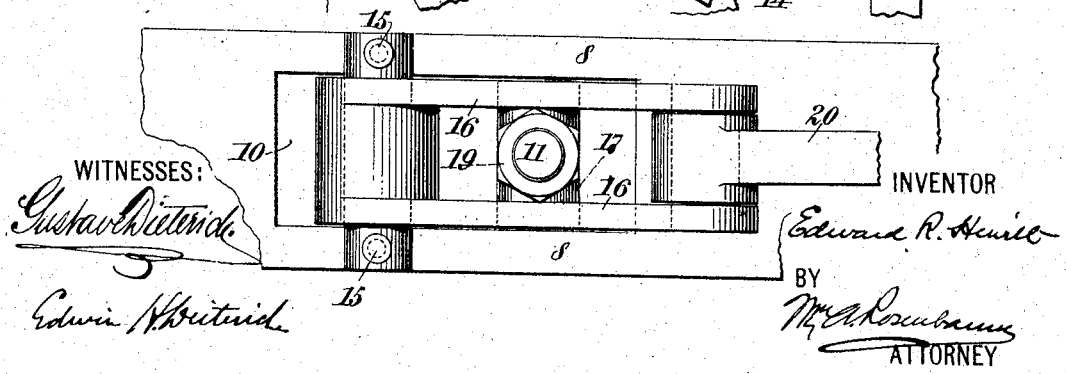
WITNESSES:
INVENTOR
Edward R. Hewitt
BY
ATTORNEY No. 781,069.

Patented January 31, 1905.

UNITED STATES PATENT OFFICE.

EDWARD R. HEWITT, OF NEW YORK, N. Y.

CONTROL-GEAR FOR AUTOMOBILES.

SPECIFICATION forming part of Letters Patent No. 781,069, dated January 31, 1905.

Application filed April 8, 1904. Serial No. 202,276.

*To all whom it may concern:*

Be it known that I, EDWARD R. HEWITT, a citizen of the United States, residing at the city of New York, in the borough of Manhattan and State of New York, have invented certain new and useful Improvements in Control-Gear for Automobiles, of which the following is a full, clear, and exact description.

This invention relates to speed-changing gearing of the class in which one change of speed may be effected by applying a brake to stop the revolution of one member of the gearing and another change may be effected by releasing the brake and then clutching together two members of the gearing. The improvements, which are applicable to various specific forms of gearing, pertain to the braking and clutching mechanisms.

One of the main objects of the invention is to provide a powerful band-brake which shall occupy but little room and be capable of ready adjustment in assembling the parts or to compensate for wear, and another object of the invention is to provide for both releasing the brake and throwing into action a clutching mechanism by means of a simple operation of a hand-lever. In carrying out the invention I provide for latching the lever at each end of its stroke and connect the lever to the brake and to the clutch by such adjustable means that the lever may be latched when either the braking mechanism or the clutching mechanism is exerting its maximum power.

In the accompanying drawings, Figure 1 is a side elevation of a structure embodying my improvements in one form, the parts being shown by full lines in clutch-operating position and by dotted lines in clutch-releasing and brake-operating position. Fig. 2 is a plan of the same. Fig. 3 shows a pair of cups forming part of a ball-and-socket joint. Fig. 4 shows an elevation of a clutch-operating bell-crank. Fig. 5 is a cotter. Fig. 6 is a sectional plan of the bell-crank seen at Fig. 4 and illustrates a ball-and-socket joint whereby it is operated. Fig. 7 is an elevation detail showing the connections for the ends of a brake-band. Fig. 8 is a section on the line $x$ $x$ of Fig. 7. Fig. 9 is a plan of the parts seen at Fig. 7.

In the several views like parts are identified by like signs.

The speed-changing mechanism may be of any desired type and may include a shaft 1, a pulley 2 upon said shaft, and clutching members 3 and 4, the latter being operated by a collar 5, slidable along the shaft and splined thereto at 6. It will be understood that when one speed forward is desired the pulley 2 must remain stationary, while the members 3 and 4 must be unclutched, and when another speed forward is wanted the pulley 2 must be permitted to revolve, while the clutching members 3 and 4 must be thrown into action, while when a reverse is wanted member 2 must be loosened and member 4 freed from 3 while the latter is held stationary. The remaining members of the speed-changing gearing may be housed within one or both of the pulleys or wheels 2 and 3; but since the present improvements are applicable to various styles of speed-changing-gear systems it is not necessary to illustrate any particular system.

The pulley 2 is encircled by a band 7, formed at one end with a loop 8, caught upon any suitable fixture, as a shaft 9. This end of the band is provided with a long eye 10, through which is passed a tip 11, that is attached at 12 to the opposite end of the band. By the expedient of passing one end of the band structure through the other it becomes practicable to carry a relatively broad and hence powerful metal band around nearly the entire periphery of the pulley, thereby materially enhancing the braking effect, and it follows that a pulley of relatively small diameter may be used, thereby effecting a great economy of room. Within said eye and at one end thereof is fixed a cross-pin 13, which is slotted at its ends at 14 to fit upon the sides of the band, to which it is fastened by rivets or screws 15. Upon this cross-pin is pivoted the lower end of a lever 16, consisting of a pair of plates, Fig. 9, in which is journaled at a point between the ends of the lever a pivot 17, the latter having a transverse perforation 18, up through which the band-tip 11 extends between the plates 16, a nut 19 being threaded upon the end of said tip to give the latter a bearing upon the pivot 17 and also enabling the length of the band to be adjusted, which is a convenience both in assembling the parts and also in compensating for wear. It will be noted at Fig. 1 that the lever 16 when the band is loose extends transversely of the tip 11, but in drawing the tip upwardly swings toward parallelism with said tip, so that the lever and band or tip form a toggle-joint whereby the band is drawn very tightly around the pulley.

By means of a link 20, pivoted to the upper end of the lever 16, the latter is connected to an operating arm or lever 21, fixed upon the shaft 9, the latter being journaled in bearings 22 and 23, fixed upon a framework 24. It is noted that the pressure of the band-loop 8 may be taken by a collar 25, placed loosely upon the shaft and provided with end flanges 26 for confining the loop. The link 20 and arm 21 form a toggle-joint and, together with the parts 11 and 16, form a compound toggle for tightening the band with great force. It will be seen at Fig. 2 that the link 20 is pivoted between the plates of the lever 16 and pivotally engages a stud 27, projecting laterally from the upper end of the arm 21 and fixed thereto, whereby movements are transmitted in direct lines and side strains and cramping avoided. Said rock-shaft 9 is also provided with a short arm 28, connected by a link 29 to an arm 30, fixed upon a second rock-shaft 31, journaled upon the framework and carrying a hand-lever 32. The shafts 1, 9, and 31 may be parallel, as shown. The link 29 may comprise two portions, one consisting of a stem 33, threaded into the other, for adjusting the length of the link, and the hand-lever may also be adjustably secured upon the shaft 31 by splitting the end of the lever, as at 34, and connecting the ends by a bolt and nut 35. It is not essential in all cases that these adjustments be provided for both link and hand-lever. The latter is provided with a latch 36 in position to engage either of two notches 37 and 38, formed in a segment 39, whereby the lever may be detained at either end of its stroke. It will be understood that by means of the described adjustments the lever may be latched in the notch 38 when the braking mechanism is exerting maximum power.

It will be understood that when it is desired to set the brake the hand-lever 32 is pulled over from full-line to dotted-line position at Fig. 1, thereby rocking the shaft 31 and through the arm 30 link 29 and arm 28 rocking the shaft 9, which by means of the arm 21 and link 20 throws up the lever 16, as shown in dotted lines, thus drawing up the stem 11 and tightening the band 7 and preventing the pulley 2 from turning. When the hand-lever 32 is moved in the opposite direction, the band is released and an arm 40, fixed upon a projecting end of rock-shaft 9, operates the splined collar 5 and forces the clutching member 4 into engagement with the member 3, this movement being effected by a link 41, pivoted to said arm 40, and a bell-crank 42, connected to said link and having a forked arm 43, provided with pins 44 to engage a peripheral groove 45, formed in the collar 5. It will be understood that the hand-lever latch 36 may engage the notch 37 in the segment 39 when the clutching member 4 engages the member 3 with maximum force. The link 41 is connected by a ball-and-socket joint to the arm of the bell-crank 42, said connection comprising a ball 46, formed or provided with a stem 47, threaded into the main portion of the link and provided with a lock-nut 48, whereby the length of the link may be adjusted to effect the proper relation between the clutch-actuating and brake-operating devices, and said ball being confined between cups 49, fitting in a bore 50, formed longitudinally in the arm 42, and caused by means of a cotter 51 to close upon said ball, the latter being inserted through a perforation 52, formed in the arm. The cotter may be round and tapering or of slightly conical form and inserted through a transverse perforation 53, formed in the arm above the upper cup 49, and upon its projecting end may be threaded to receive a binding-nut 54, its opposite end being provided with a screw-driver nick 55. By simply tightening the nut the cotter is drawn through the arm and owing to its tapering form has the effect of wedging down the upper cup 49, (the cup being preferably crowned at 56 to engage the cotter,) whereby a nice fit of the cup upon the ball is secured and wear may be taken up, while the parts are not liable to become loosened through the operation and jarring of the mechanism.

The member 3 may be held stationary by means of a strap similar to the strap 7 and operated by a separate mechanism, (not shown,) but usually a foot-lever. When this strap is actuated, the member 2 is supposed to be free and member 4 disconnected from 3. To bring about this condition, the lever 40 in moving from its dotted-line to its full-line position, Fig. 1, releases strap 7 without throwing in clutch member 4. Hence by holding lever 40 at any point intermediate of the two positions mentioned (by means of lever 32) the strap can be applied to member 2 and a reverse accomplished.

The pivotal point of the bell-crank is at 42' upon the same bracket 23 that carries the bearing for shaft 9, affording a stiff construction.

Variations may be resorted to within the scope of the invention, and portions of the improvements may be used without others.

Having described my invention, I claim—

1. A band-brake comprising a pulley, a band thereon, one end of the band having an elongated eye, a fixture to which said end is attached, a cross-pin fixed in said eye, a lever consisting of a pair of plates pivoted upon said pin within said eye, a pivot journaled in said plates, and provided with a transverse opening, a tip attached to the other end of the band and passing through the opening in said pivot between said plates, and a nut threaded upon the projecting end of said tip.

2. A band-brake comprising a pulley, a band thereon, a fixture to which one end of the band is attached, said end of the band being provided with an eye and the other end of the band having a tip which passes through said eye, a lever pivoted at one end upon said band near said eye, and adjustably connected between its ends to said tip, a link connected to the outer end of said lever, and a manually-operable lever forming a toggle-joint with said link.

3. In a change-speed mechanism, the combination of a pulley, a band thereon, a rock-shaft, a hand-lever adjustably secured upon said rock-shaft, means for latching said hand-lever at either end of its stroke, an arm secured upon said rock-shaft, a band-tightening lever to which said arm is adjustably connected, and clutching members to one of which said arm is also adjustably connected, the clutching member being operable by a movement of the hand-lever in band-releasing direction.

In witness whereof I subscribe my signature in presence of two witnesses.

EDWARD R. HEWITT.

Witnesses:
FRANK S. OBER,
WALDO M. CHAPIN.